(12) United States Patent
Kim

(10) Patent No.: US 10,187,744 B2
(45) Date of Patent: Jan. 22, 2019

(54) SIMPLIFIED METHOD FOR PLACING TELEPHONE CALL AND SIMPLIFIED METHOD FOR REQUESTING LOCATION-BASED SERVICE

(71) Applicant: Taegu Kim, Seoul (KR)

(72) Inventor: Taegu Kim, Seoul (KR)

( * ) Notice: Subject to any disclaimer, the term of this patent is extended or adjusted under 35 U.S.C. 154(b) by 161 days.

(21) Appl. No.: 15/102,753

(22) PCT Filed: Dec. 10, 2014

(86) PCT No.: PCT/KR2014/012165
§ 371 (c)(1),
(2) Date: Jun. 8, 2016

(87) PCT Pub. No.: WO2015/088254
PCT Pub. Date: Jun. 18, 2015

(65) Prior Publication Data
US 2017/0019756 A1    Jan. 19, 2017

(30) Foreign Application Priority Data

Dec. 10, 2013  (KR) .................. 10-2013-0153259
Sep. 18, 2014  (KR) .................. 10-2014-0124051

(51) Int. Cl.
*H04W 4/02*    (2018.01)
*H04M 1/274*   (2006.01)
(Continued)

(52) U.S. Cl.
CPC ....... *H04W 4/02* (2013.01); *H04M 1/274558* (2013.01); *H04M 1/72572* (2013.01);
(Continued)

(58) Field of Classification Search
CPC ................ H04W 4/02; H04W 68/005; H04M 1/274558; H04M 1/7258
(Continued)

(56) References Cited

U.S. PATENT DOCUMENTS 6,386,450 B1    5/2002   Ogasawara
6,816,720 B2 *  11/2004  Hussain .............. G06F 17/3087
                                                455/404.2

FOREIGN PATENT DOCUMENTS

KR   10-2003-0080388 A   10/2003
KR   10-2007-0034894 A    3/2007
(Continued)

OTHER PUBLICATIONS

International Search Report of PCT/KR2014/012165.
Written Opinion of International Searching Authority of PCT/KR2014/012165.

*Primary Examiner* — Marisol Figueroa
(74) *Attorney, Agent, or Firm* — IPLA P.A.; James E. Bame

(57) ABSTRACT

A simple calling method comprises setting and registering into a hot key storage a hot key corresponding to contact numbers of a called terminal; inputting a certain key and a calling trigger key on a key input interface of a calling terminal; determining whether the inputted certain key matches the hot key registered in the hot key storage; upon determination that the inputted certain key matches the hot key, converting the inputted hot key to the contact numbers of the called terminal; and processing the converted contact numbers for calling and sending a request signal to the called terminal to request a call connection with the called terminal.

7 Claims, 20 Drawing Sheets

(51) Int. Cl.
*H04M 1/2745* (2006.01)
*H04M 3/44* (2006.01)
*H04M 1/725* (2006.01)
*H04W 68/00* (2009.01)

(52) U.S. Cl.
CPC ........... *H04M 3/44* (2013.01); *H04W 68/005* (2013.01); *H04M 1/7258* (2013.01)

(58) Field of Classification Search
USPC .............................................. 455/456.1–457
See application file for complete search history.

(56) References Cited

FOREIGN PATENT DOCUMENTS

| KR | 10-2009-0130782 A | 12/2009 |
| KR | 10-0993636 B1 | 11/2010 |
| KR | 20120091513 A | 8/2012 |
| KR | 20140059571 A | 5/2014 |

\* cited by examiner

SERVICE PROVIDER INFO

NUMBER :

SEX :

CURRENT LOCATION :

NAME (BRANCH NAME) :

| ACCEPTANCE | REJECTION |

| SELECTION | NAME (BRANCH NAME) | | LOCATION |
|---|---|---|---|
| ☐ 1. | △△△. | MALE. | A |
| ☒ 1. | ○○○. | MALE. | B |
| ☐ 1. | □□□. | MALE. | C |
| ☐ 1. | △△△. | FEMALE. | D |

REJECTION though.
SIMPLIFIED METHOD FOR PLACING TELEPHONE CALL AND SIMPLIFIED METHOD FOR REQUESTING LOCATION-BASED SERVICE

FIELD OF THE PRESENT DISCLOSURE

The present disclosure relates to a simple calling method and location-based service-requesting method, and, more particularly, to a simple calling method where without inputting actual contact numbers of a called terminal, inputting of only a hot key corresponding to the actual contact numbers may trigger a calling operation to the called terminal, and/or furthermore, to a location-based service simple-requesting method where without inputting actual contact numbers of a service-provider, inputting of only a hot key corresponding to the actual contact numbers of the service-provider may trigger execution of a program stored in the user terminal to allow current location information and contact numbers of the user terminal to the service management server.

DISCUSSION OF THE RELATED ART

Generally, as mobile communications technologies have improved, mobile communications terminals may have various application programs installed therein in addition to simple functions such as voice-call, data transmission, content display, etc. wherein the application programs may facilitate user's life.

For location-based application programs, a user may request various services including, for example, paging, calling, icon-related data request, data communications, voice-call, etc. to a service-provider based on a location of the user (or a mobile communications terminal thereof).

However, in this approach, due to flooded information, a specific application program to be used should be found out manually by the user among many application programs stored in the mobile communications terminal of the user. Furthermore, the user should touch an execution icon to execute the specific application program, and should manually perform many procedures step by step to obtain a target service. This may be worse for a person unfamiliar with a recent IT device.

The conventional location-based service searches for contact numbers or locations of the service-providers on its own and perform a calling operation to the service-providers in a mobile environment on its own. Thus, the service request operation may be inconvenient and the service requester should pay for the calling fee.

In the conventional calling method, the caller should input contact numbers manually one by one. This may lead to lowered user experience.

A prior art document:
Patent document 1: Korean patent application publication No. 10-2012-0126156 (publication date: 2012 Nov. 21)
Patent document 2: Korean patent application publication No. 10-2011-0011294 (publication date: 2011 Feb. 8)

SUMMARY

Form considerations of the above situations, the present disclosure provides a simple calling method and location-based service simple-requesting method.

First, the present disclosure provides a simple calling method where without inputting actual contact numbers of a called terminal, inputting of only a hot key (for example 1004, #1000, *1000) corresponding to the actual contact numbers may trigger a calling operation to the called terminal, such that the calling operation may be easy for the user and the user needs not remembering the long actual contact numbers and thus the calling service may improve.

Second, the present disclosure provides a location-based service simple-requesting method where only inputting of a simple execution command key (for example, only inputting of a simple dial key) may trigger a request operation of the location-based service quickly.

Third, the present disclosure provides a location-based service simple-requesting method where only inputting of a simple execution command key (for example, only inputting of a simple dial key) may trigger execution of a location-based service application program, such that the user needs not finding out manually a desired location-based service application program, and thus a person unfamiliar with execution of the application program may use the application program easily.

Fourth, the present disclosure provides a location-based service simple-requesting method where only inputting of virtual numbers (series of numbers or series of special symbols) corresponding to contact numbers triggering execution of an application program may trigger execution of the application program, such that, for a location-based service, the user needs not inputting manually contact numbers of a service provider of interest and thus may execute the location-based application program conveniently.

Fifth, the present disclosure provides a location-based service simple-requesting method where, at the same time of the execution of the application program, the location information and contact numbers of the user may be automatically sent to the service management server.

Sixth, the present disclosure provides a location-based service simple-requesting method where when the location information of the user terminal is not acquired, the execution command key may be converted to actual contact numbers of the service-provider to allow calling operation, thereby to prevent interruption of the service request.

Seventh, the present disclosure provides a location-based service simple-requesting method where after checking service-provider information from the service management server, the service requester user terminal may select a service-provider from the information, thereby to create a service requester-oriented service supply environment.

Eighth, the present disclosure provides a location-based service simple-requesting method where when the user terminal requests a service of the service management server, destination information and paging information may be selectively sent to the server.

Ninth, the present disclosure provides a location-based service simple-requesting method where although the user terminal may extract the location information thereof on its own and send the same to the service management server, the present disclosure is not limited thereto, but a mobile communications provider may send the location information of the user to the service management server, such that acquisitions of the location information of the user may be highly successful.

In an aspect of the present disclosure, there is provided a simple calling method comprising: an operation of setting and registering into a hot key storage a hot key corresponding to contact numbers of a called terminal; an operation of inputting a certain key and a calling trigger key on a key input interface of a calling terminal; an operation of determining whether the inputted certain key matches the hot key registered in the hot key storage; upon determination that the inputted certain key matches the hot key, an operation of converting the inputted hot key to the contact numbers of the called terminal; and an operation of processing the converted contact numbers for calling and sending a request signal to the called terminal to request a call connection with the called terminal.

In one embodiment, the operation of setting and registering into the hot key storage the hot key corresponding to contact numbers of the called terminal comprise an operation of inputting a hot key setting key on the key input interface; an operation of displaying a hot key input interface in a form of a user interface by a hot key setting module upon receipt of the hot key setting key; an operation of inputting a hot key on the input interface via the key input interface; an operation of storing the inputted hot key in the hot key storage by a hot key storage module; an operation of displaying an actual contact numbers input interface in a form of a user interface for inputting the actual contact numbers of the called terminal corresponding to the stored hot key; an operation of inputting the actual contact numbers on the actual contact numbers input interface via the key input interface; and an operation of correlating the inputted contact numbers with the hot key and storing the correlation by the hot key storage module.

In an aspect of the present disclosure, there is provided a location-based service simple-requesting method comprising: an operation of receiving a key value(s) from a key input interface; an operation of determining whether the key value(s) from the key input interface matches an execution command key; and upon determination that the key value(s) from the key input interface matches the execution command key; and an operation of sending service request information to a service management server by a user terminal.

In one embodiment, upon determination that the key value(s) from the key input interface matches the execution command key, the user terminal sends current location information thereof along with the service request information to the service management server.

In one embodiment, upon determination that the key value(s) from the key input interface matches the execution command key, the method comprises: extracting the location information in a location information reception module in the user terminal; and sending the extracted current location information along with the service request information to the service management server.

In one embodiment, upon completion of the operation of sending service request information to a service management server by a user terminal, a location information supply module operated by a mobile communication service provider sends location information of the user terminal to the service management server.

In one embodiment, when the service management server receives the service request information upon completion of the operation of sending service request information to a service management server by a user terminal, the service management server requests location information of the user terminal of a location information supply module operated by a mobile communication service provider, and then, the location information supply module operated by the mobile communication service provider sends the location information of the user terminal to the service management server in a response to the request.

In one embodiment, upon determination that the key value(s) from the key input interface matches the execution command key, the method comprises: an operation of displaying a destination setting user interface to query whether to input a destination for the user; when a destination setting acceptance key signal is inputted after the destination setting user interface is displayed, an operation of displaying a destination input user interface to allow inputting of the destination; an operation of inputting the destination on the destination input user interface via the key input interface; an operation of storing the inputted destination into a data information storage; and an operation of extracting current location information of the user terminal, the user terminal sends the current location information thereof, the service request information and the inputted destination information to the service management server.

In one embodiment, upon determination that the key value(s) from the key input interface matches the execution command key, the method comprises: an operation of check a state of a location information reception module for acquiring the location information of the user terminal and determining based on the checking result whether the location information reception module is in a turn-on state; upon determination that the location information reception module is not in a turn-on state, an operation of outputting a control command using the location information reception module control module to enable the location information reception module to be in a turn-on state; an operation of turning-on the location information reception module in a response to the control command; when the operation is executed or it is determined that the location information reception module is in a turn-on state, an operation of extracting current location information of the user terminal from the location information reception module.

In one embodiment, upon the extraction of the location information, the method comprises: an operation of converting the execution command key to an IP address of the service management server; and an operation of sending the extracted current location information, and contact numbers of the user terminal and the service request information to the service management server having the converted IP address.

In one embodiment, when the extraction of the location information fails, the method comprises: an operation of displaying a voice-call connection user interface to allow a voice-call connection request module to activate voice-call connection; when a voice-call connection acceptance key is inputted after displaying the voice-call connection user interface, an operation of converting the execution command key to contact numbers of the service management server using a voice-call connection request module; and an operation of sending a voice-call connection signal to the service management server based on the converted contact numbers from the voice-call connection request module.

In one embodiment, prior to the operation of the sending the current location information and contact numbers of the user terminal and the service request information to the service management server, the method comprises: an operation of displaying a paging setting user interface to allow setting of paging of the service management server; when a paging setting rejection key is inputted, an operation of sending the current location information and contact numbers of the user terminal and the service request information to the service management server; and when a paging setting acceptance key is inputted, an operation of sending the current location information and contact numbers of the user terminal and the service request information together with paging information to the service management server.

In one embodiment, the method further comprises an operation of checking by the service management server whether the paging information is present in a signal from the user terminal; and upon determination that the paging information is present in a signal from the user terminal, an operation of automatically calling the user terminal by the service management server.

In one embodiment, the method further comprises an operation of checking by the service management server whether the paging information is present in a signal from the user terminal; upon determination that the paging information is not present in a signal from the user terminal, an operation of selecting a service provider terminal based on the service request from the user terminal; and an operation of sending service-provider information on the selected service provider terminal to the user terminal.

In one embodiment, the method further comprises an operation of determining by the user terminal whether a service provider in the service-provider information from the service management server is single or plural; upon determination that the service provider in the service-provider information from the service management server is single, an operation of displaying the single service-provider; an operation of determining whether to accept or reject the displayed service-provider; upon determination to accept the displayed service-provider, an operation of sending acceptance information to the service management server; and upon determination to reject the displayed service-provider, an operation of sending rejection information to the service management server.

In one embodiment, the method further comprises: an operation of determining by the user terminal whether a service provider in the service-provider information from the service management server is single or plural; upon determination that the service provider in the service-provider information from the service management server is plural, an operation of displaying the plural service-providers; an operation of determining whether to select one of the plural service-providers or reject all of the plural service-providers; and an operation of sending selection information on a selected service-provider upon determination to select one of the plural service-providers, or sending rejection information to the service management server.

The above present simple calling method and location-based service simple-requesting method may have following effects:

First, without inputting actual contact numbers of a called terminal, inputting of only a hot key (for example 1004, #1000, *1000) corresponding to the actual contact numbers may trigger a calling operation to the called terminal, such that the calling operation may be easy for the user and the user needs not remembering the long actual contact numbers and thus the calling service may improve.

Second, only inputting of a simple execution command key (for example, only inputting of a simple dial key) may trigger a request operation of the location-based service quickly.

Third, only inputting of a simple execution command key (for example, only inputting of a simple dial key) may trigger execution of a location-based service application program, such that the user needs not finding out manually a desired location-based service application program, and thus a person unfamiliar with execution of the application program may use the application program easily.

Fourth, only inputting of virtual numbers (series of numbers or series of special symbols) corresponding to contact numbers triggering execution of an application program may trigger execution of the application program, such that, for a location-based service, the user needs not inputting manually contact numbers of a service provider of interest and thus may execute the location-based application program conveniently.

Fifth, at the same time of the execution of the application program, the location information and contact numbers of the user may be automatically sent to the service management server.

Sixth, when the location information of the user terminal is not acquired, the execution command key may be converted to actual contact numbers of the service-provider to allow calling operation, thereby to prevent interruption of the service request.

Seventh, after checking service-provider information from the service management server, the service requester user terminal may select a service-provider from the information, thereby to create a service requester-oriented service supply environment.

Eighth, when the user terminal requests a service of the service management server, destination information and paging information may be selectively sent to the server.

Ninth, although the user terminal may extract the location information thereof on its own and send the same to the service management server, the present disclosure is not limited thereto, but a mobile communications provider may send the location information of the user to the service management server, such that acquisitions of the location information of the user may be highly successful.

In this connection, the service management server requests the location information of the mobile communications provider and may receive the location information. Alternatively, without the location information request, the service management server may directly receive the location information of the user terminal.

BRIEF DESCRIPTIONS OF THE DRAWINGS

FIG. 17 shows an example of displaying single service-provider information in FIG. 16.

FIG. 18 shows an example of displaying plural service-provider information in FIG. 16.

DETAILED DESCRIPTIONS

Hereinafter, preferred embodiments of the present simple calling method and location-based service simple-requesting method will be described in details with reference to accompanying drawings.

As used herein, a term "location-based service" may refer to a service where a service-provider provides a service request with a specific service based on a location of a service request (for example, a user terminal) and a location of the service-provider (for example, a service provider terminal). Such a location-based service may include, by way of example, a chauffeur service, a call taxi service, food delivery service, etc.

Figure 1:
FIG. 1 shows a configuration of a simple calling system for implementing a simple calling method in accordance with a first embodiment of the present disclosure.
Figure 2:
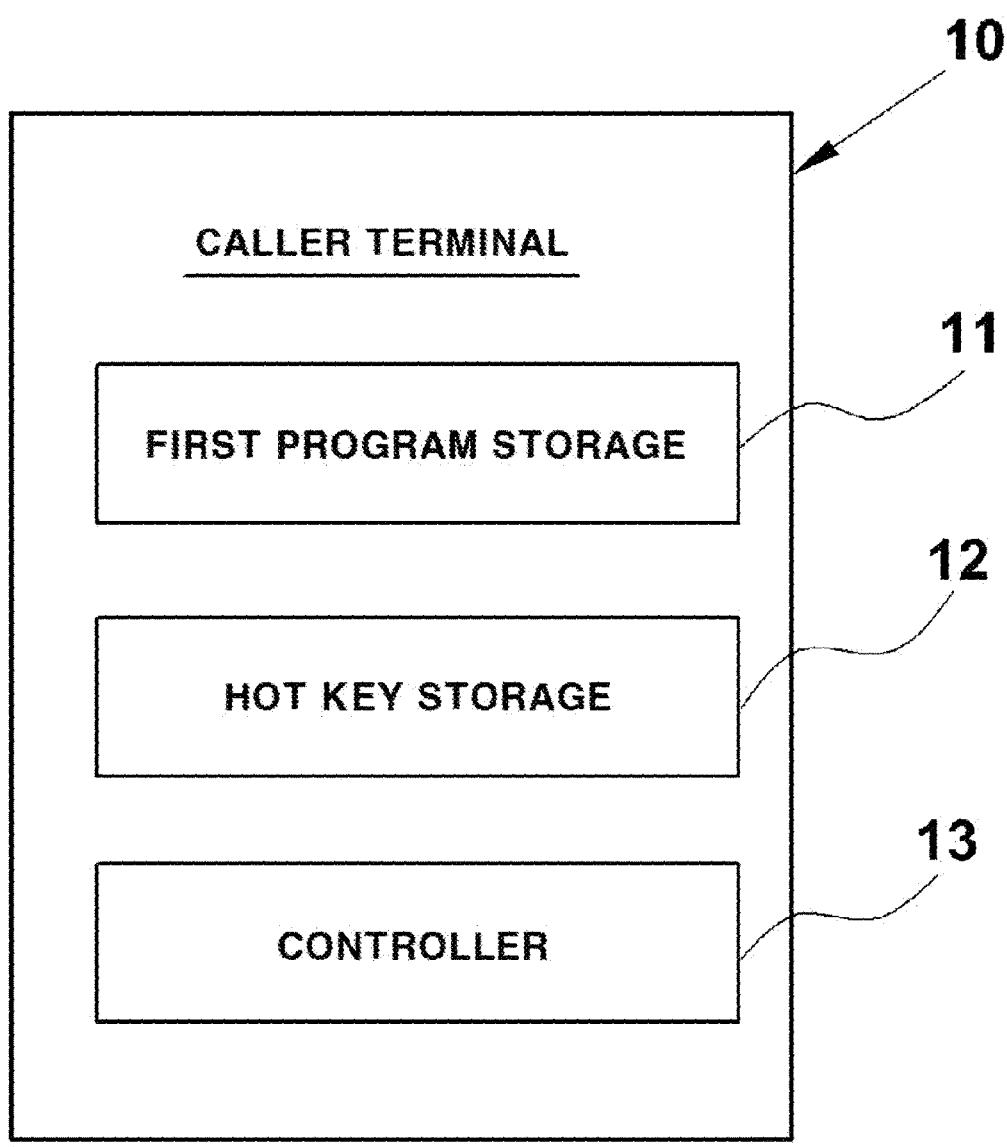
FIG. 2 shows a high level block diagram of a calling terminal in FIG. 1.

FIG. 1 shows a high level system diagram for implementing a simple calling method in accordance with a first embodiment of the present disclosure. FIG. 2 shows a high level block diagram of a calling terminal 10.

As shown in FIG. 1, a simple calling method in accordance with a first embodiment of the present disclosure may include a calling terminal 10 and a called terminal 20.

The calling terminal 10 may be configured to store therein and execute application programs. For example, the terminal 10 may include a mobile phone, PDA, smartphone, tablet, notebook, etc. The calling terminal 10 may be configured to execute a following first program when the user presses a hot key wherein the hot key refers to a key or a combination of keys which the user easily memorizes and quickly and simply presses, thereby to convert the hot key to an actual number for the called terminal 20 and call the called terminal 20.

The called terminal 20 may be, for example, a terminal operated by an individual business, including a food, or flower delivery, a chauffeur service, a call taxi driver, etc. Such a business may employ a hot key as their contact number for the purpose of an advertisement thereof.

The calling terminal 10 may include a first program storage 11 to store a first program therein, a hot key storage 12, and a first controller 13 configured to control overall operations of the calling terminal 10 and to control call processing and execution, execution of the first program, data input/output, operations of a RF (Radio Frequency) unit (not shown), etc.

Figure 3:
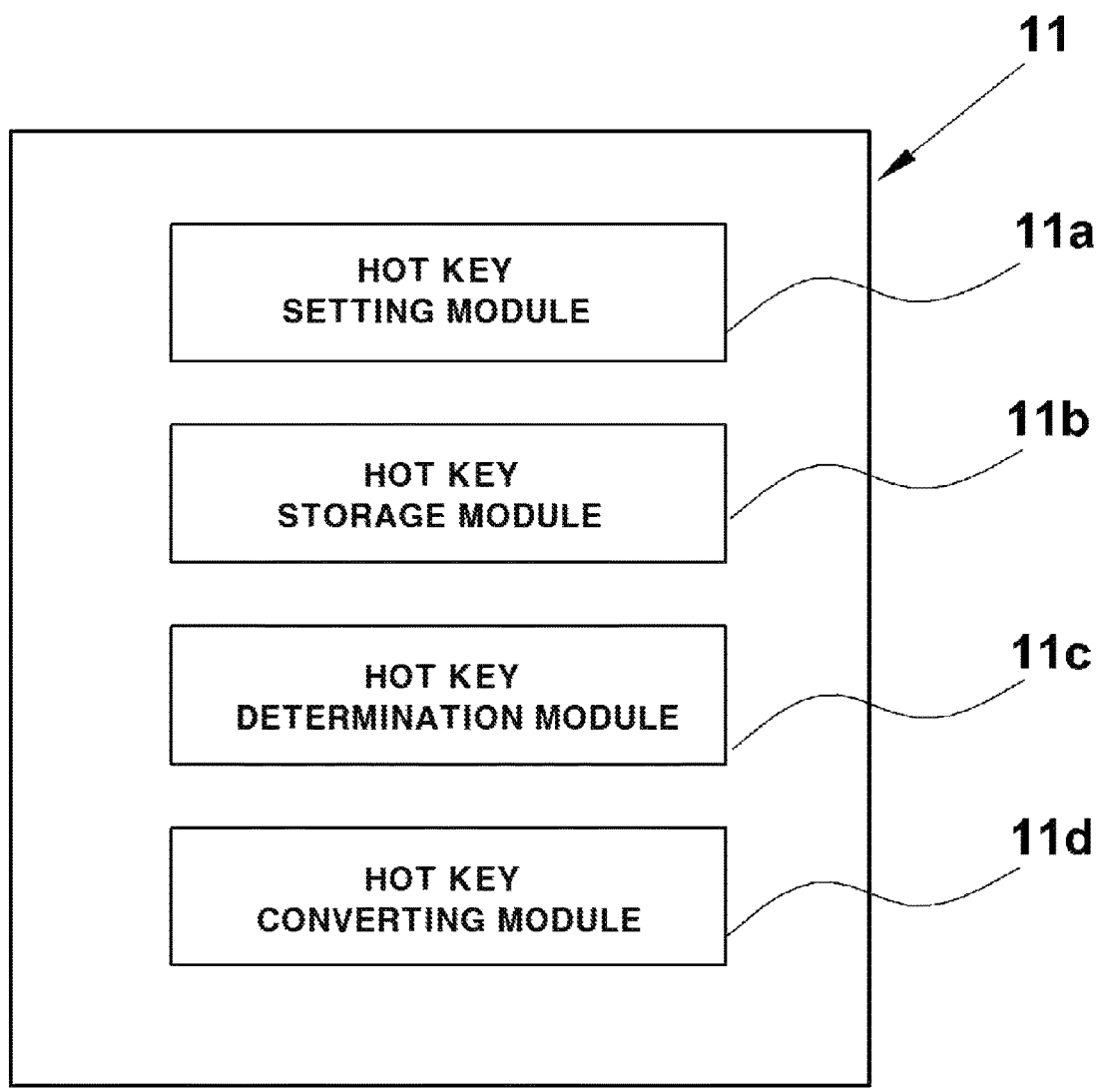
FIG. 3 shows a configuration diagram of a program module corresponding to first program storage in FIG. 2.

FIG. 3 shows a configuration diagram of a program module in the first program storage 11.

The first program storage 11 may include the program module including a hot key setting module 11a, a hot key storage module 11b, a hot key determination module 11c, and an actual number converting module 11d. Herein, the program module may correspond to the first program in a hardware, software or a combination thereof.

The hot key setting module 11a may be configured to allow a hot key input interface (not shown) to be displayed on a display unit (not shown) of the calling terminal 10 when hot key setting keys are to be inputted. The hot key setting module 11a may be configured to allow an actual contact numbers input interface to be displayed on a display unit (not shown) of the calling terminal 10 when the actual contact numbers for the called terminal 20 are to be inputted.

The hot key storage module 11b may be configured to correlate the hot key inputted from a key input interface and the actual contact numbers for the called terminal 20 and to store the correlation to the hot key storage 12.

The hot key determination module 11c may be configured to determine whether a key signal inputted from the key input interface (not shown) matches the hot key registered in the hot key storage (not shown).

The actual number converting module 11d may be configured to convert the inputted hot key to the actual contact numbers for the called terminal 20.

The hot key storage 12 may store therein the hot key. The hot key storage 12 may store therein the correlations between the hot key inputted from a key input interface and the actual contact numbers for the called terminal 20 as described above.

The calling terminal 10 may conventionally include the RF (Radio Frequency) unit (not shown), the display unit (not shown), a memory unit, a DSP (Digital Signal Processor), etc. as known to the skilled person to the art.

Hereinafter, a simple calling method executed using the above configured system as in FIG. 1 will be described in details.

Figure 4:
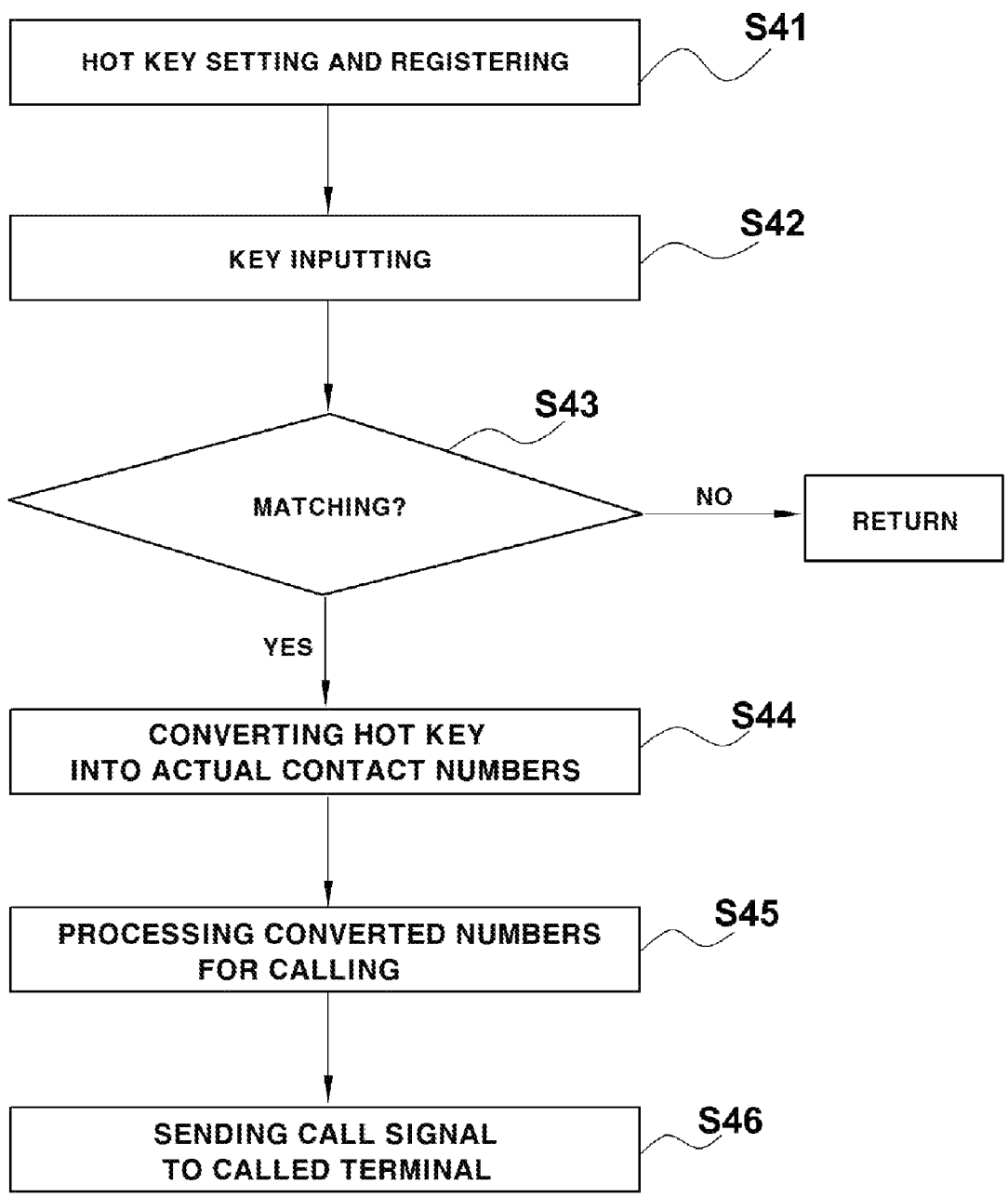
FIG. 4 show a flow chart of a simple calling method in accordance with a first embodiment of the present disclosure.
Figure 5:
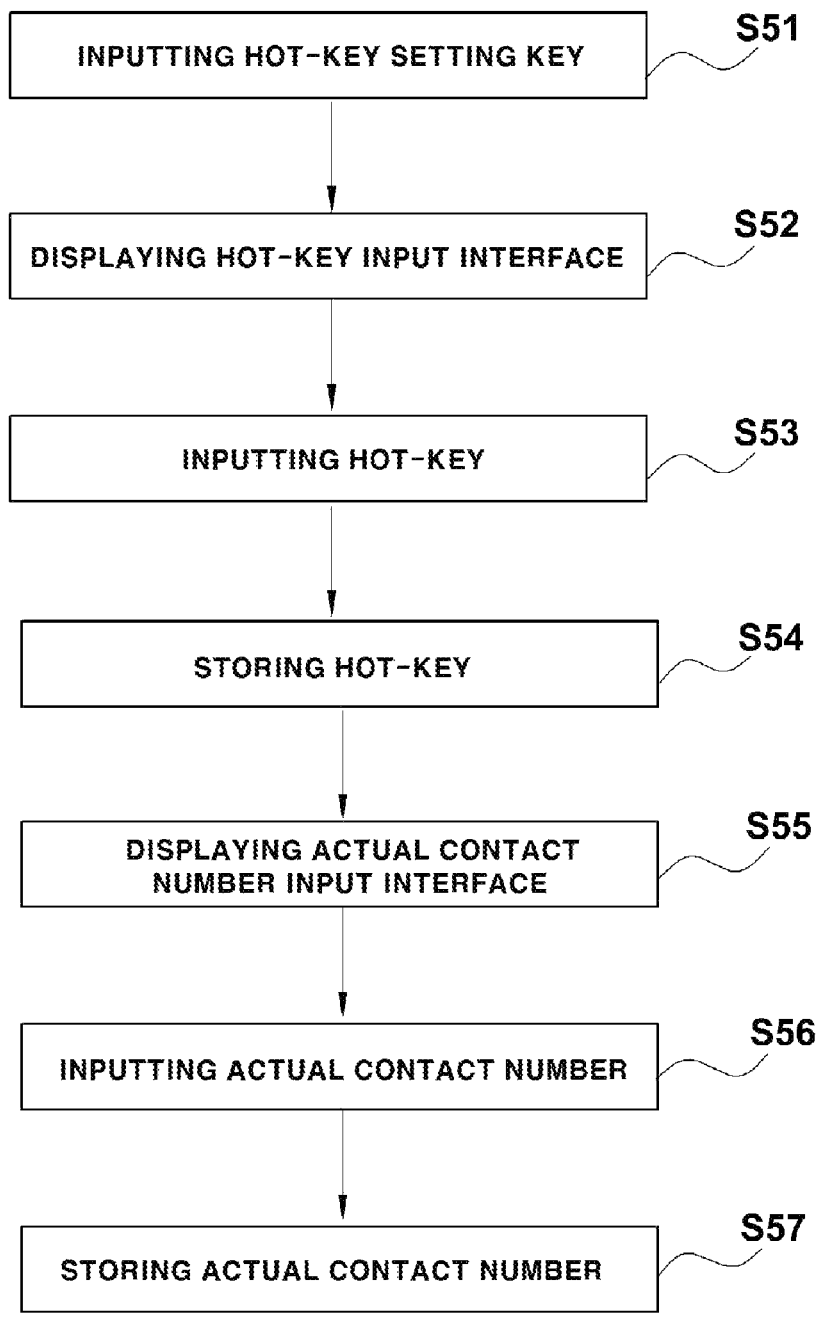
FIG. 5 shows a flow chart of a hot key setting registering operation in FIG. 4 에서 S41.

FIG. 4 shows a flow chart of a simple calling method in accordance with one embodiment of the present disclosure. FIG. 5 shows a flow chart of details of
a hot key setting registering operation S41 in FIG. 4.

First, for the actual contact numbers for the called terminal 20 to be called (for example, 02-5723-6578), a hot key may be set to be correspond to the actual contact numbers for the called terminal 20. This correspondence therebetween may be registered (operation S41).

The hot key may be set to have easy memorization or easy input thereof. The hot key may be set to, for example, 1004, 3000, 5000, 7000, 7777, etc. Further, the special keys including #, *, @, etc. may be added to the hot key. For example, the #1004, *10004, etc. may be possible as the hot key.

The hot key setting registering operation S41 may be as follows as shown in FIG. 5.

First, via the key input interface (not shown), a hot key setting operation (for example, a long pressure of # key) may be activated (S51).

Upon activation of the hot key setting operation, the hot key setting module 11a may allow the hot key input interface (not shown) for the hot key (for example 1004) input to be displayed in a user interface form on the display unit (not shown) of the calling terminal 10 (S52);

A hot key (for example, 1004) may be inputted via the hot key input interface using the key input interface (S53).

The input hot key may be stored in the hot key storage 12 using the hot key storage module 11b (S54).

The hot key setting module 11a may display an actual contact numbers input interface (not shown) on the display unit (not shown) of the calling terminal in a user interface form in order to input the actual contact numbers for the called terminal corresponding to the hot key stored in the hot key storage 12 (S55).

The actual contact numbers may be input via the actual contact numbers input interface using the key input interface S56. Then, the inputted contact numbers may be correlated with the hot key stored using the hot key storage module 11b in the hot key storage 12 and the correlation may be stored (S57).

Hereinafter, a simple calling method to the called terminal 20 using the hot key when the correlation is stored will be described in details.

While the correlation between the hot key and the actual contact numbers (for example, 02-5723-6578) for the called terminal 20 is registered, a certain key value(s) and calling trigger key may be inputted via the key input interface of the calling terminal 10 (S42).

When the certain key value(s) and calling trigger key have been inputted via the key input interface of the calling terminal 10 (S42), the calling terminal 10 may enter into a "hot key service mode" where a calling operation is performed using a hot key.

The hot key determination module 11c may determine whether the inputted key signal or value(s) matches that of the hot key registered in the hot key storage (not shown) in the operation S43.

Upon determination using the hot key determination module 11c that the inputted key signal matches that of the hot key registered in the hot key storage, the hot key determination module 11c may sends the inputted key signal to the actual number converting module 11d. Then, the actual number converting module 11d may convert the inputted hot key signal to the actual contact numbers (for example, 02-5723-6578) for the called terminal 20 (S44).

The actual number converting module 11d may send the converted contact numbers to the first controller 13, which, in turn, may process the converted contact numbers for calling (S45).

The first controller 13 may send the resulting signal resulting from the processing of the converted contact numbers for calling to the RF unit (not shown) of the calling terminal 10 which in turn may send the signal to the called terminal 20 (S46).

Hereinafter, a location-based service simple-requesting system and method in accordance with a second embodiment of the present disclosure will be described with reference to FIG. 6 to FIG. 20 in details.

Figure 6:
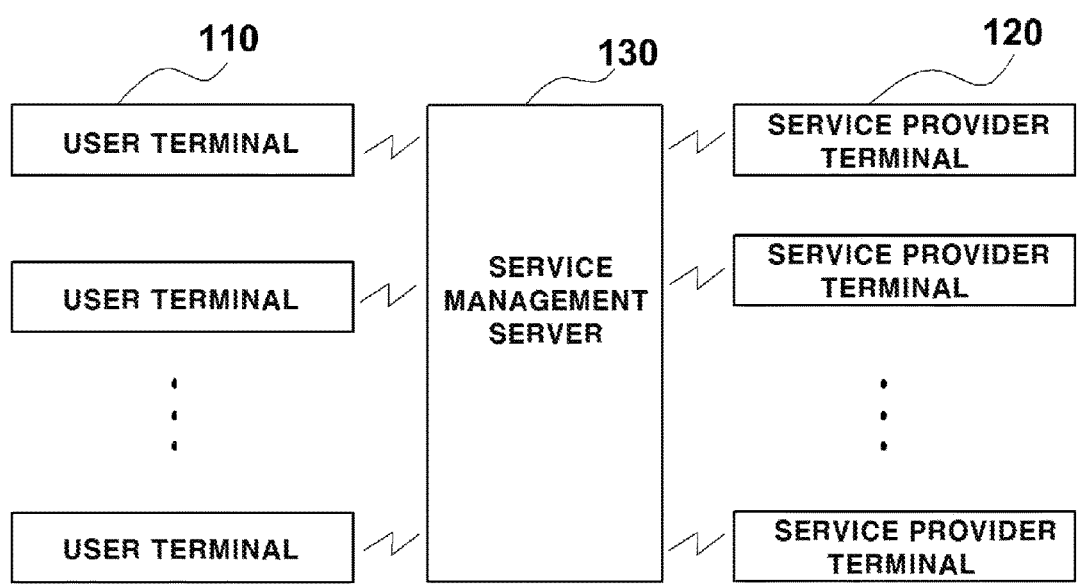
FIG. 6 shows a configuration diagram of a location-based service simple-requesting system for implementing a location-based service simple-requesting method in accordance with a second embodiment of the present disclosure.
Figure 7:
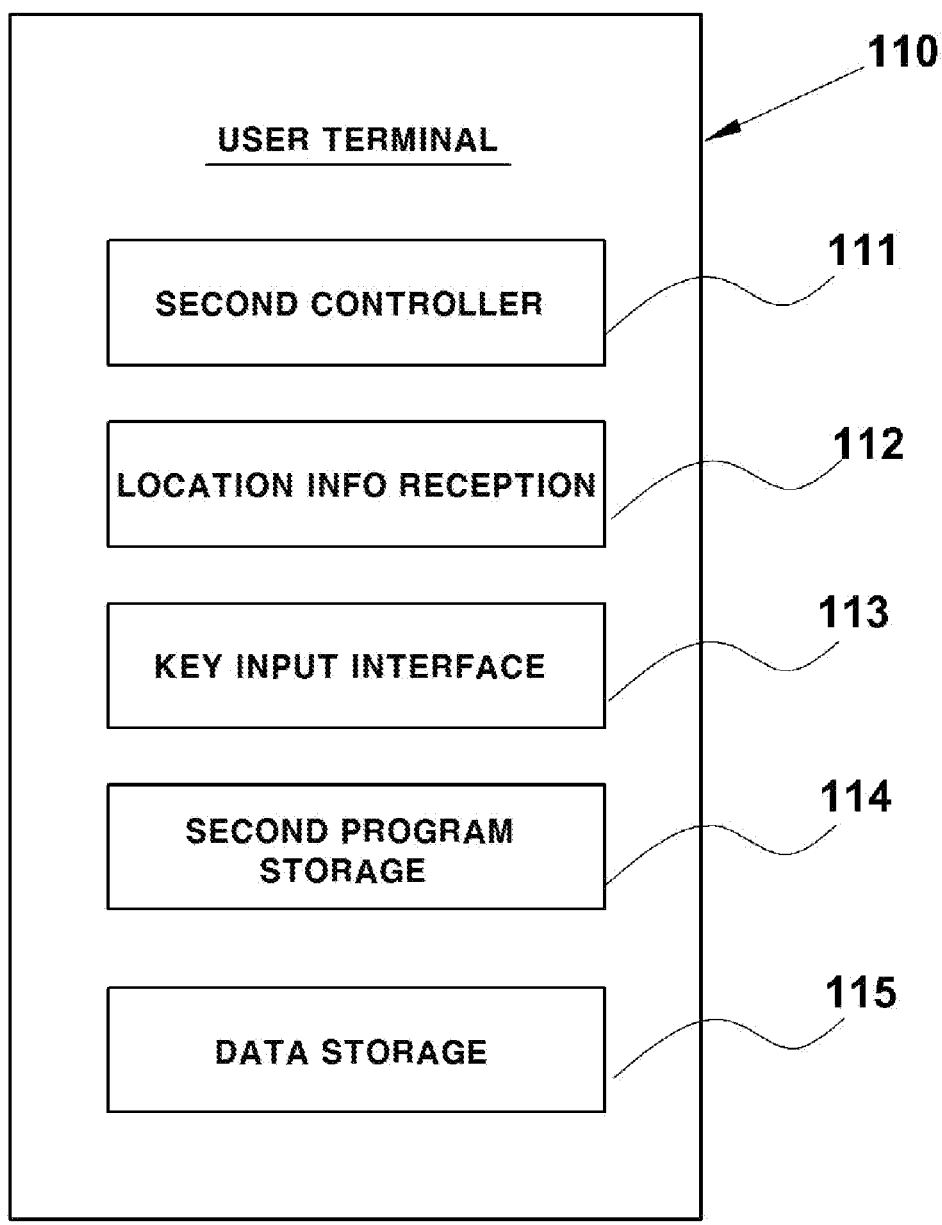
FIG. 7 shows a high level block diagram of a user terminal in FIG. 6.
Figure 8:
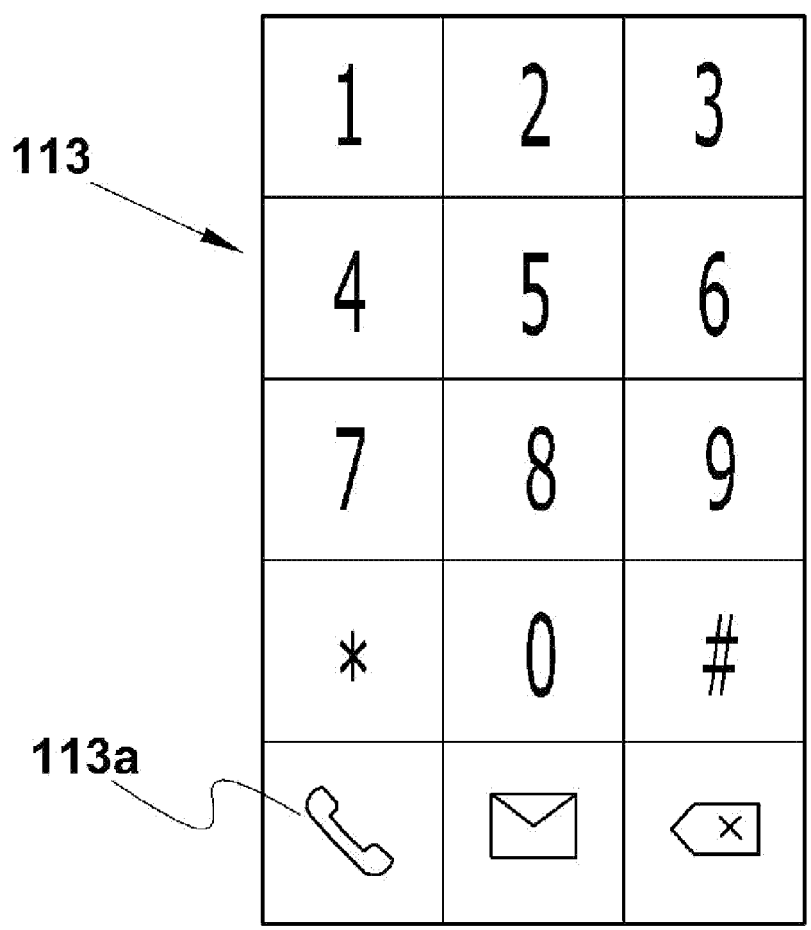
FIG. 8 shows an example of a use of a key input interface FIG. 7.
Figure 9:
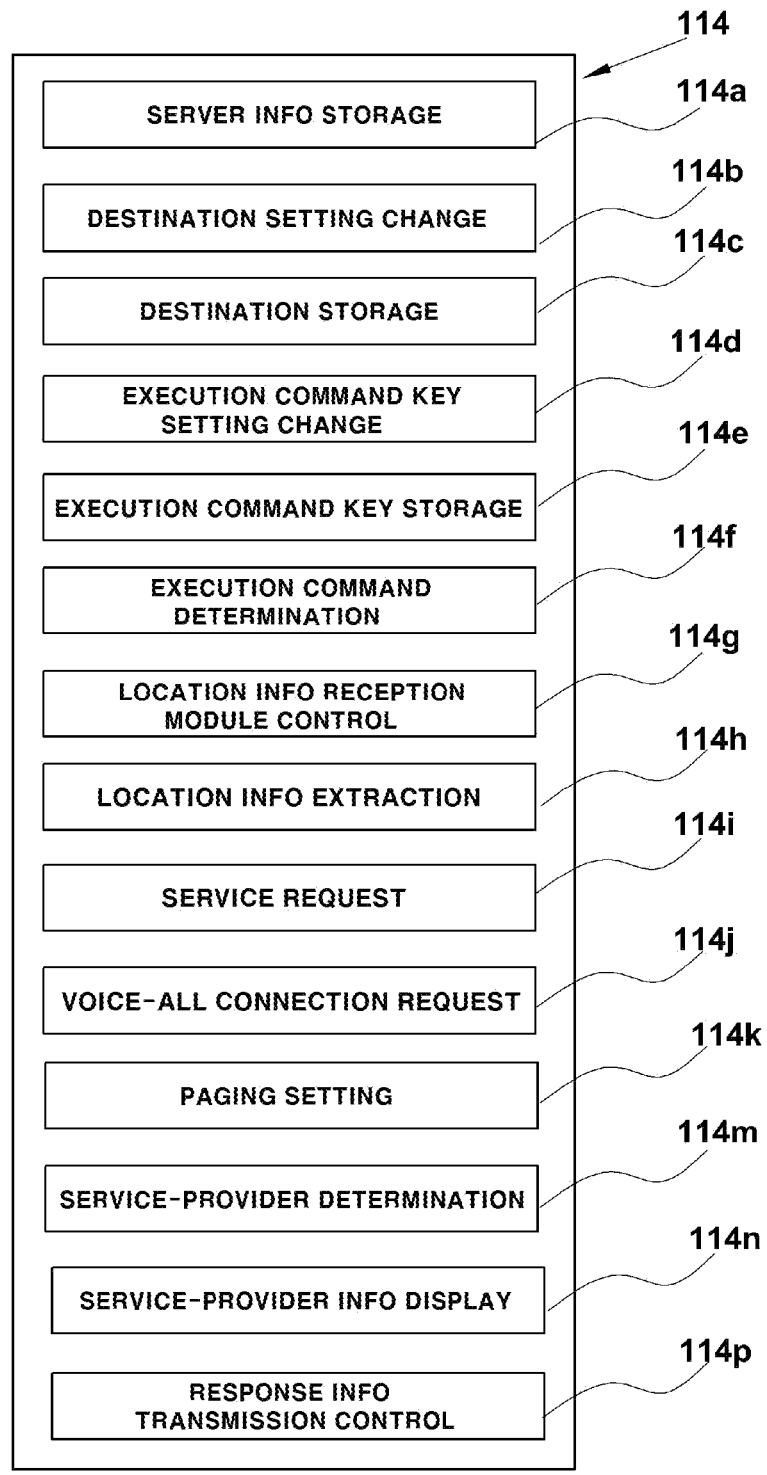
FIG. 9 shows a configuration diagram of program module corresponding to a second program storage in FIG. 6.

FIG. 6 shows a configuration diagram of a location-based service simple-requesting system in accordance with a second embodiment of the present disclosure. FIG. 7 shows a high level block diagram of a user terminal 110 in FIG. 6. FIG. 8 shows an example use of a key input interface 113. FIG. 9 shows a configuration diagram of a second program module corresponding to a second program storage 114.

A location-based service simple-requesting system in accordance with one embodiment of the present disclosure may include a user terminal 110 and service management server 130.

The user terminal 110 may store the second program configured to allow simple automatic request for a location-based service. In this connection, when an execution command key is inputted via the key input interface 113, the second program may allow the simple automatic request for the location-based service. Thus, the user terminal 110 may use location-based service information provided by the service management server 130.

The user terminal 110 may include, for example, a mobile terminal, tablet, notebook, PDA with an execution function of an application program.

The user terminal 110 may include a second controller 111, a location information reception module 112, the key input interface 113, a second program storage 114 and a data information storage 115.

The location information reception module 112 may receive location information for the user terminal 110 from an external AP (access point) equipment (not shown) or GPS device (not shown) and store the location information therein.

In an alternative, the location information reception module 112 may be configured to receive cell-based location information from a location information supply module 140 operated by a mobile communication provider.

The location information reception module 112 may include, for example, a GPS reception module (not shown), and/or an AP reception module (not shown).

The location information stored in the location information reception module 112 may be read or extracted using the second controller 111 of the user terminal 110 or a location information extraction module 114h in the second program module.

While the location information for the user terminal 110 may be stored in the location information reception module 112 in one embodiment, in another embodiment, the location information from the location information reception module 112 may be stored in a separate storage, for example, a memory module.

The key input interface 113 may be configured to receive a key signal such as an execution command key and destination information etc. FIG. 8 show one example of the key input interface 113 as a dial key input interface.

The second program storage 114 may include a server information storage module 114a, a destination setting changing module 114b, a destination storage module 114c, an execution command key setting changing module 114d, an execution command key storage module 114e, an execution command determination module 114f, a location information reception module control module 114g, the location information extraction module 114h, a service request module 114i, a voice-call connection-request module 114j, a paging setting module 114k, a service-provider determination module 114m, a service-provider information display module 114n, and a response information transmission control module 114p.

The server information storage module 114a may store information about the service management server 130, for example, an IP address, contact numbers, etc. of the service management server 130.

When the execution command determination module 114f determines that the inputted key value(s) matches the execution command key, the destination setting changing module 114b may be configured to display a destination setting user interface 116a on a display unit (not shown) wherein the destination setting user interface 116a may be configured to display to the user whether the user intends to input the destination.

Further, when a destination setting acceptance key signal is inputted from key the input interface 113, the destination setting changing module 114b may be configured to display a destination input user interface 116b on the display unit (not shown) wherein the destination input user interface 116b may allow the user to input the destination.

The destination storage module 114c may store the destination information inputted from the destination input user interface 116b to the data information storage 115.

The execution command key setting changing module 114d may be configured to allow the user of the user terminal to input and set the execution command key.

The execution command key storage module 114e may store the set execution command key in the data information storage 115 after the user has set the execution command key using the execution command key setting module 114d.

The execution command determination module 114f may be configured to compare the key value(s) from the key input interface 113 with the execution command key stored in the data information storage 115 and to determine whether the inputted key value(s) matches the execution command key. Further, the execution command determination module 114f may be configured to send a command to a second controller 111 to execute a general voice-call trigger mode when the inputted key value(s) mismatches the execution command key.

The location information reception module control module 114g may be configured to check a status of the location information reception module 112 for acquiring location information of the user terminal 110 and to determine whether the location information reception module 112 is in a turn-on or off state.

Further, upon determination that the location information reception module 112 is in a turn-off state, the location information reception module control module 114g may be configured to enable the location information reception module 112 to be into the turn-on state.

The service request module 114i may be configured to convert the execution command key to an IP address of the service management server 130 when the location information extraction module 114h normally extracts current location information of the user terminal 110.

Further, the service request module 114i may be configured to send a command to the second controller 111 to request a destination corresponding to the converted IP address of the service of interest.

In this connection, the second controller 111 may be configured to enable transmission of the current location information and contact numbers of the user terminal 110 and service request information to the IP address of the service management server 130 in accordance with the command of the service request module 114i, such that the current location information and contact numbers of the user terminal 110 and the service request information are sent from the user terminal 110 to the service management server 130.

The voice-call connection request module 114j may be configured to display on the display unit (not shown) a voice-call connection user interface 116d to allow voice-call connections when the location information extraction module 114h does not extract the location information.

The voice-call connection request module 114j may be configured to convert the execution command key to contact numbers of the service management server 130 when the voice-call connection acceptance key is inputted after the displaying of the voice-call connection user interface 116d, and to output voice-call request data along with the converted contact numbers to the second controller 111.

The paging setting module 114k may be configured to display a paging setting user interface 116c on the display unit (not shown) to allow setting of paging of the service management server 130.

Furthermore, the paging setting module 114k may be configured to, when a paging setting rejection key is inputted from the key input interface 113, send indication to the second controller 111 to indicate that the paging setting is not done, and, when a paging setting acceptance key is inputted, to paging information to the second controller 111.

The service-provider determination module 114m may be configured to determine whether a service-provider in the service-provider information from the service management server 130 is plural or not.

The service-provider information display module 114n may be configured to display the service-provider information from the service management server 130. Specifically, the service-provider information display module 114n may be configured to display on the display unit whether a service-provider in the service-provider information from the service management server 130 is plural or not.

That is, when the service-provider determination module 114m determines that a service-provider in the service-provider information from the service management server 130 is single, the service-provider information display module 114n may be configured to display information on a single service-provider along with a user interface to ask whether the received service-provider information is to be accepted or rejected. when the service-provider determination module 114m determines that a service-provider in the service-provider information from the service management server 130 is plural, the service-provider information display module 114n may be configured to display data on plural service-providers along with a first user interface to ask whether the received service-provider information is to be accepted or rejected and with a second user interface to allow selection among the plural service-providers.

The response information transmission control module 114p may be configured to determine whether the information on the single service-provider is to be accepted or rejected based on user input from the key input interface, and, upon determination that an acceptance key signal is inputted, to generate acceptance information and send the same to the second controller 111 or otherwise, upon determination that a rejection key signal is inputted, to generate rejection information and send the same to the second controller 111.

Further, the response information transmission control module 114p may be configured to determine whether one of the plural service-providers is to be selected or rejected based on user input from the key input interface, and, upon determination that a selection key signal is inputted, to generate selection information and send the same to the second controller 111 or otherwise, upon determination that a rejection key signal is inputted, to generate rejection information and send the same to the second controller 111.

The data information storage 115 may be configured to store an execution command key value(s), and, furthermore, to store destination information of a user of the user terminal.

The second controller 111 may be configured to execute the second program stored in the second program storage 114 and to control all operations of the user terminal including a call processing, data transmission and reception, etc.

The user terminal 110 may include conventional components for a general mobile communication device, for example, a RF UNIT (not shown), DSP (not shown), display unit (not shown), etc.

When the service management server 130 receives service request information from the user terminal 110, the service management server 130 may be configured to select a service provider terminal 120 within a preset distance (for example, 1 Km) from the user terminal 110 or closest to the user terminal 110. The service management server 130 may be configured to acquire information on a service provider corresponding to the selected service provider terminal 120 and to send the acquired information the user terminal 110.

The service management server 130 may include a call center unit having an automatic dialing function or ARS function.

Moreover, a method by which the service management server 130 selects the service provider terminal 120 may include, for example, constantly monitoring the location of the service provider terminal 120, comparing the location information of the user terminal with the location information of the service provider terminal 120, selecting a service provider terminal 120 within a given distance from the user terminal 110 or closest therefrom based on the comparison, and acquiring information on the selected service provider from the service provider terminal 120.

Moreover, the service management server 130 may include a service provider database (not shown). The service provider database may contain information on the service provider, for example, contact numbers of a mobile terminal operated by the service provider, a name of the service provider (for example, store name), a sex of the service provider, a name of the service provider, an address of the service provider (for example, a branch name of a franchise business), etc.

The service provider terminal 120 may be operated or carried by the service provider, and may include, for example, mobile communications terminals, wired phones, IP phones, etc.

The service provider may include a chauffeur, a call taxi driver, a delivery business (for example, a branch of a franchise business), etc.

Figure 19:
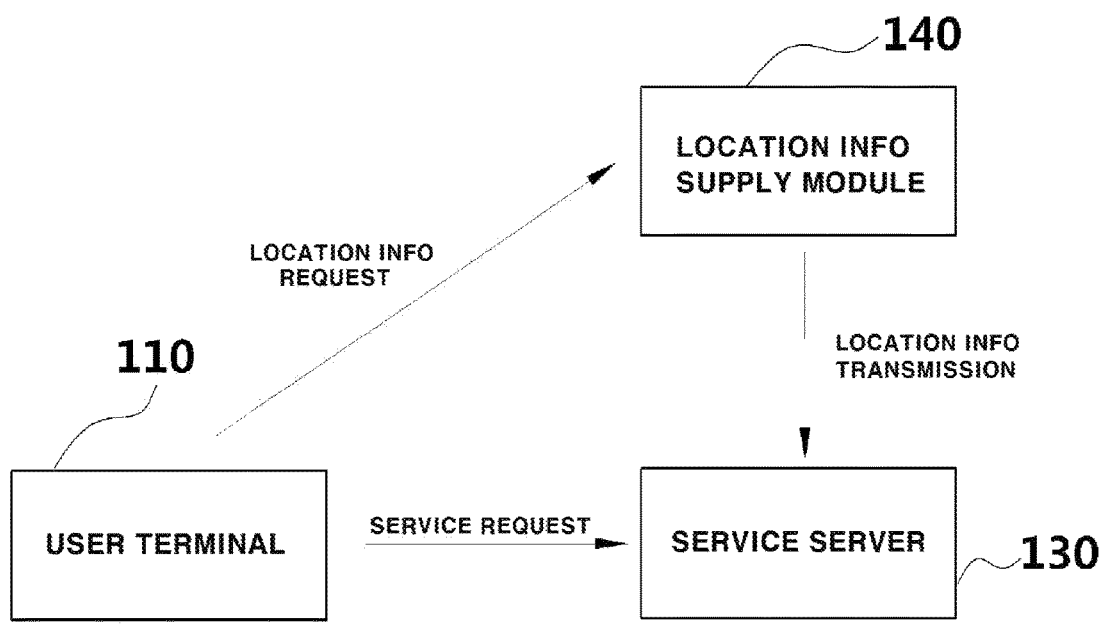
FIG. 19 shows a block diagram of a variation of a method for acquiring location information of a user terminal in a location-based service simple-requesting system for implementing a location-based service simple-requesting method in accordance with a second embodiment of the present disclosure.

FIG. 19 shows a block diagram of a variation of a method for acquiring location information of a user terminal in a location-based service simple-requesting system for implementing a location-based service simple-requesting method in accordance with a second embodiment of the present disclosure.

Although, in the above-described second embodiment, the user terminal 110 sends the location information thereof on its own, in the variation embodiment of FIG. 19, the user terminal 110 does not send the location information thereof, but a mobile communications system operated by a mobile communications provider (for example, SKT, KT, LGT companies; those are Korean mobile communications providers) sends the location information of the user terminal 110 to the service management server 130.

At the same time as when the user terminal 110 sends service request information to the service management server 130 in the operation S236 or after the user terminal 110 sends service request information to the service management server 130 in the operation S236, the user terminal 110 may send a location information request signal to a location information supply module 140 operated by a mobile communication service provider, which in turn may send the location information of the user terminal 110 to the service management server 130.

In this connection, the location information supply module 140 operated by the mobile communication service provider may refer to an equipment contained in the mobile communications system including, for example, a base station (BS), a BS controller, a mobile communications exchange station, a home location registering station, a LBS (Location Based Service) server, etc. and configured to acquire the location information of the user terminal 110 and to supply the acquired location information upon request. For example, the function of the location information supply module 140 may be carried out by the base station (BS), a BS controller, a mobile communications exchange station, a home location registering station, a LBS (Location Based Service) server, etc. The present disclosure is not limited thereto. Any functional module may act as the location information supply module 140 as long as it supplies the location information of the user terminal.

Moreover, the location information supply module 140 operated by the mobile communication service provider may send not only the location information but also contact numbers of the user terminal 110.

Figure 20:
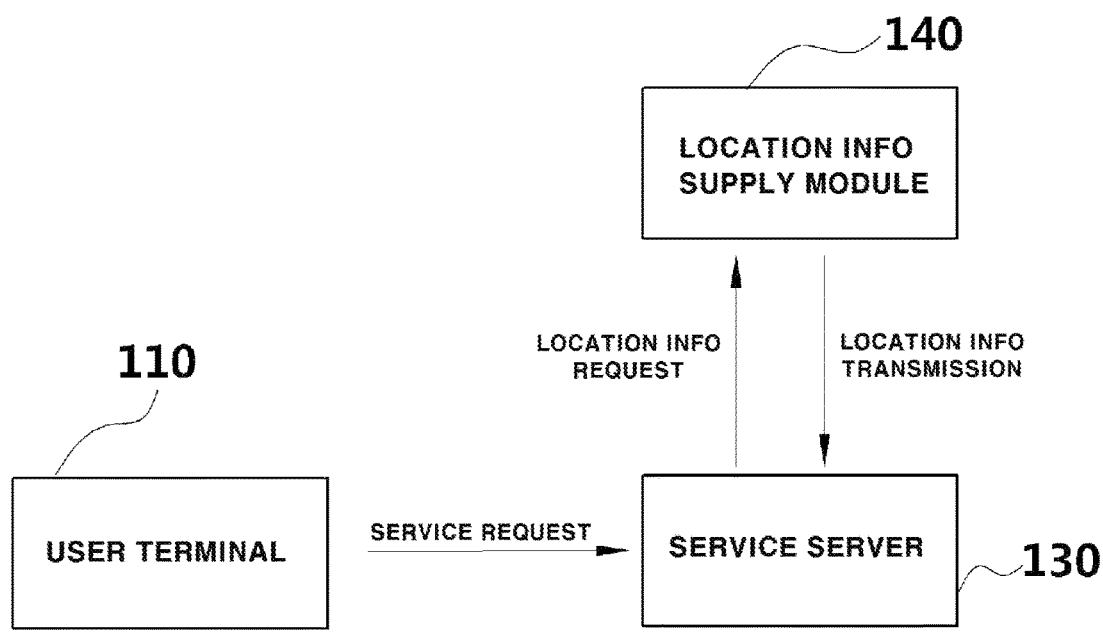
FIG. 20 shows a block diagram of a further variation of a method for acquiring location information of a user terminal in a location-based service simple-requesting system for implementing a location-based service simple-requesting method in accordance with a second embodiment of the present disclosure.

FIG. 20 shows a block diagram of a further variation of a method for acquiring location information of a user terminal in a location-based service simple-requesting system for implementing a location-based service simple-requesting method in accordance with a second embodiment of the present disclosure.

As shown in FIG. 20, in a response to the operation S236 of the user terminal 110 sending the service request information to the service management server 130, the service management server 130 may receive the service request information, and, in turn, the service management server 130 may send a request signal of the location information of the user terminal 110 to the location information supply module 140 operated by the mobile communications provider.

Moreover, when the location information supply module 140 operated by the mobile communications provider receives the location information request signal from the service management server 130, the location information supply module 140 may be configured to send the location information of the user terminal 110 to the service management server 130.

In this connection, when the user terminal 110 sends the service request information to the service management server 130, the user terminal 110 may send contact numbers thereof along the service request information.

Further, the location information supply module 140 operated by the mobile communication service provider may directly obtain the location information of the user terminal 110 or may indirectly obtain the location information of the user terminal 110 via a separate location information acquisition unit for a further storage of the obtained location information. Whether the location information supply module 140 directly or indirectly obtains the location information, the method for acquiring the location information of the mobile communications terminal may be implemented as various methods well known to the skilled person to the art.

Hereinafter, a location-based service simple-requesting method carried out by the above mentioned location-based service simple-requesting system, in accordance with one embodiment of the present disclosure will be described in details.

Figure 10:
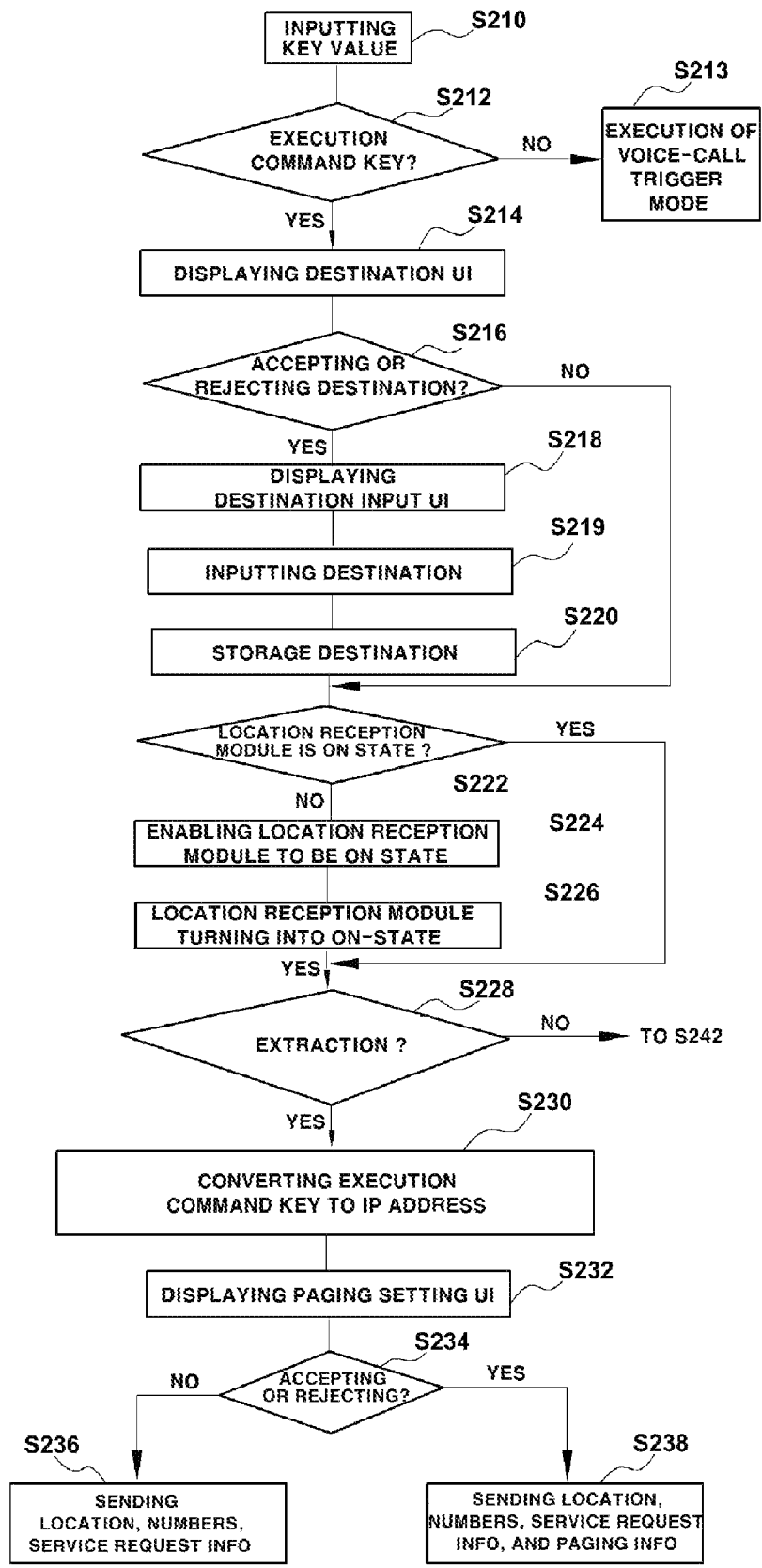
FIG. 10 shows a flow chart of a location-based service simple-requesting method in accordance with one embodiment of the present disclosure.
Figure 11:
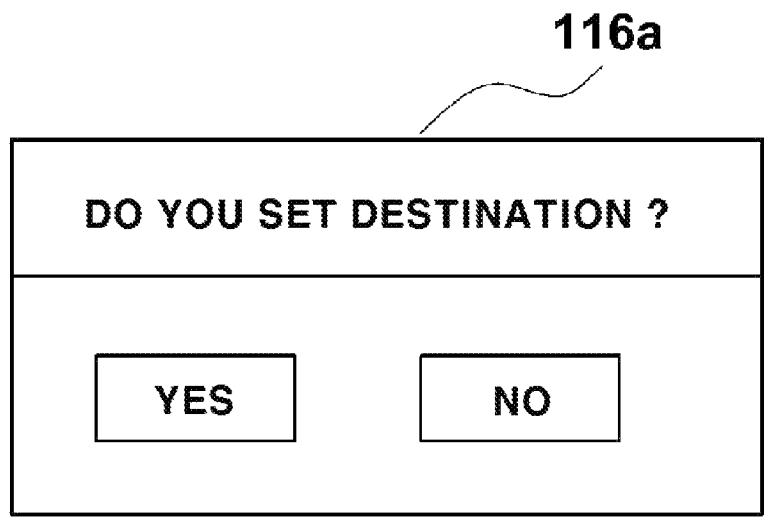
FIG. 11 shows an example of a use of a destination setting user interface in FIG. 10.

FIG. 10 shows a flow chart of a location-based service simple-requesting method in accordance with one embodiment of the present disclosure. FIG. 11 shows an example of a use of a destination setting user interface 116a in FIG. 10.

Figure 12:
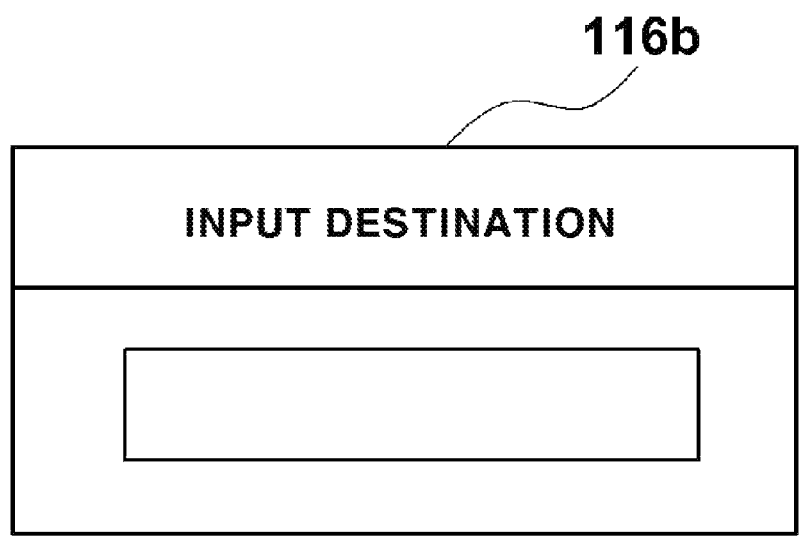
FIG. 12 shows an example of a use of a destination input user interface in FIG. 10.
Figure 13:
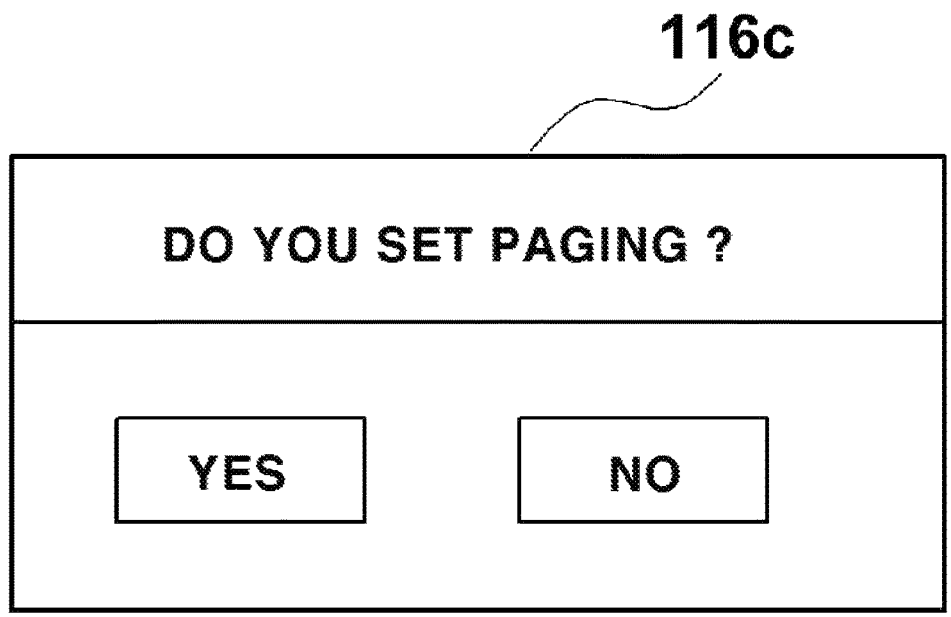
FIG. 13 shows an example of a use of a paging setting user interface in FIG. 10.

FIG. 12 shows an example of a use of a destination input user interface 116b in FIG. 10. FIG. 13 shows an example of a use of a paging setting user interface 116c in FIG. 10.

The user of the user terminal 110 may input the execution command key on the key input interface 113 (for example, a dial key interface) (S210).

The execution command key may include, for example, actual contact numbers of the service management server 130 or contact numbers of a call center operated by the service management server 130 or combinations of symbols, numbers, and special keys (for example, *1004). The execution command key may include a combination of keys which may be easily remembered by the user of the user terminal 110.

Moreover, just after the execution command key is inputted or after another service use key is inputted, a call trigger key 113a may be inputted as a final input key. When the call trigger key 113a is inputted, the actual phone call operation may be initiated. Thus, when actual contact numbers or virtual contact numbers are inputted as the execution command key, it may be desirable to set the operation 210 such that the call trigger key 113a should be inputted after the actual contact numbers or virtual contact numbers.

When via the key input interface 113 the key value(s) (or a combination of the key value(s) and call trigger key 113a) is inputted, a first program stored as an application program in the first program storage 11 may be executed under control of the second controller 111.

In this way, the input operation of the execution command key may seem like an actual calling operation. The input operation of the execution command key may trigger the execution of the application program. Thus, the user needs not manually finding out the application program, thereby to allow easy execution of the application program.

When via the key input interface 113 the key value(s) (or a combination of the key value(s) and call trigger key 113a) is inputted, the execution command determination module 114f in the second program may determine whether the inputted key value(s) matches the execution command key (S212).

That is, the execution command determination module 114f may be configured to read an execution command key from the data information storage 115 and compare the execution command key with the inputted key value(s) and then determine whether the inputted key value(s) matches the execution command key (S212).

In this connection, upon determination by the execution command determination module 114f that the inputted key value(s) mismatches the execution command key, a command to allow execution of a general voice-call trigger mode may be sent to the second controller 111 (S213).

Otherwise, upon determination by the execution command determination module 114f that the inputted key value(s) matches the execution command key, the location information extraction module 114h may extract current location information of the user terminal 110 (S228).

In accordance with the embodiment of FIG. 10, when the execution command key value(s) is inputted, prior to the location information extraction module 114h extracting the current location information of the user terminal 110, a destination setting operation may be selectively carried out.

The example location-based service including the destination setting operation may include a chauffeur service, a call taxi service, etc.

That is, upon determination by the execution command determination module 114f that the inputted key value(s) matches the execution command key, the destination setting changing module 114b may display a destination setting user interface 116a on a display unit (not shown) to query whether to input a destination (S214).

For example, as shown in FIG. 11, an expression "do you set a destination?" may be displayed along with a user interface to allow acceptance or rejection of the destination setting operation.

As shown in FIG. 11, when an option "yes" is inputted, the destination setting acceptance may be inputted. Otherwise, when an option "no" is inputted, the destination setting rejection may be inputted.

After the destination setting user interface 116a is displayed and when via the key input interface 113, the destination setting acceptance key signal (the option "yes" in FIG. 11) is inputted, the destination setting changing module 114b may perceive this and display a destination input user interface 116b in a UI (user interface) form on a display unit (not shown) to allow inputting of the destination (S218).

As shown in FIG. 12. When the destination input user interface 116b is displayed, via the key input interface 113 the destination may be inputted S219, and, then, the inputted destination may be stored by the destination storage module 114c into the data information storage 115 (S220).

After the destination is inputted and stored, the above mentioned location information extraction module 114h may extract the current location information of the user terminal 110.

Otherwise, after the destination setting user interface 116a is displayed, a destination input rejection key signal (the option "no" in FIG. 12) is inputted S216, the above-described location information extraction module 114h may extract the current location information of the user terminal 110 as described above; or otherwise, the location information reception module control module 114g may check the state of the location information reception module 112 and then determine whether the location information reception module is in a turn-on state (S222) as will be described later.

Moreover, in accordance with a further variation embodiment, after the destination is inputted and stored, the location information reception module control module 114g may check the state of the location information reception module 112 to acquire the location information of the user terminal 110, and then determine whether the location information reception module is in a turn-on state (S222).

Upon determination by the location information reception module control module 114g that the location information reception module 112 is in a turn-on state S222, the location information extraction module 114h may extract the current location information of the user terminal 110 contained in the location information reception module 112 (S228).

Otherwise, upon determination by the location information reception module control module 114g that the location information reception module 112 is not in a turn-on state S222, the location information reception module control module 114g may enable the location information reception module 112 to be in a turn-on state (S224).

The operation S224 of the location information reception module control module 114g enabling the location information reception module 112 to be in a turn-on state may include, for example, an operation of the location information reception module control module 114g sending data to the second controller 111 to indicate that the location information reception module 112 is not currently in a turn-on state, and an operation of the second controller 111 enabling the location information reception module 112 to be in a turn-on state in a response to the data reception. Otherwise, the location information reception module control module 114*g* may enable the location information reception module 112 to be in a turn-on state on its own. Whether to employ the former or latter may depend on applications of the present method.

In this way, the location information reception module control module 114*g* may control the location information reception module 112 to be in a turn-on state S226, and, accordingly, the location information reception module 112 may receive and acquire the location information.

When the location information reception module 112 receives the location information in a real-time, the location information extraction module 114*h* may extract the current location information of the user terminal 110 contained in the location information reception module 112 (S228).

In this connection, when the location information extraction module 114*h* normally extracts the current location information of the user terminal 110, the service request module 114*i* may convert the inputted execution command key to an IP address of the service management server 130 (S230).

Meanwhile, in another embodiment, when the service management server 130 is not connected to Internet, the execution command key may be converted not to the IP address but contact numbers of the service management server 130. Then, the service management server 130 may send to the converted contact numbers the current location information, and contact numbers of the user terminal 110, and the service request information.

Moreover, the service request module 114*i* may be configured to send a command signal to the second controller 111 to perform service request toward the converted IP address. Then, in a response to the command from the service request module 114*i*, the second controller 111 may be configured to allow sending of the current location information of the user terminal 110 and contact numbers thereof, and associated service request information to the IP address of the service management server 130. As a result, the current location information of the user terminal 110 and the contact numbers thereof, and the associated service request information may be sent from the user terminal 110 to the service management server 130 (S236).

If via the key input interface 113, the destination is inputted, the destination information may be sent to the service management server 130 together with the current location information of the user terminal 110 and contact numbers thereof, and the service request information.

Moreover, in one embodiment, after completion of the operation S236, the user terminal 110 may perform an automatic calling operation to the service management server 130.

In another embodiment, prior to the operation S236 of sending the current location information of the user terminal 110 and contact numbers thereof and the service request information 旨 service management server 130, the paging setting module 114*k* may be configured to display a paging setting user interface 116*c* on the display unit (not shown) to allow setting of the paging of the service management server 130 (an operation (S232)).

The paging function may refer to a function by which, when the user terminal 110 requests the associated of the service management server 130, the service management server 130 or a call center operated by the service management server 130 triggers a calling operation to the service user. Upon the paging setting, paging setting information may be sent to the service management server 130 and, then, in a response to the receipt of the paging setting information, the service management server 130 may perform an automatic calling operation (that is, paging) to the user terminal 110 of the service requester.

FIG. 13 shows one example of the paging setting user interface 116C where upon inputting a "yes" option, the paging is set; or inputting a "no" option, the paging is not set.

When via the key input interface 113, a paging setting rejection key (a "no" option in FIG. 13) is inputted S234, the paging setting module 114*k* may be configured to send information to the second controller 111 to indicate that the paging is not set. Therefore, the current location information of the user terminal 110 and contact numbers thereof and the associated service request information may be sent to the service management server 130 (S236).

Moreover, when a paging setting acceptance key is inputted S234, the paging setting module 114*k* may be configured to send paging information to the second controller 111, and, accordingly, the second controller 111 may be configured to allow sending of the paging information together with the current location information of the user terminal 110 and contact numbers thereof, and the associated service request information to the IP address of the service management server 130. As a result, together with the current location information of the user terminal 110 and contact numbers thereof, and the service request information, the paging information may be sent from the user terminal 110 to the service management server 130 (S238).

Figure 14:
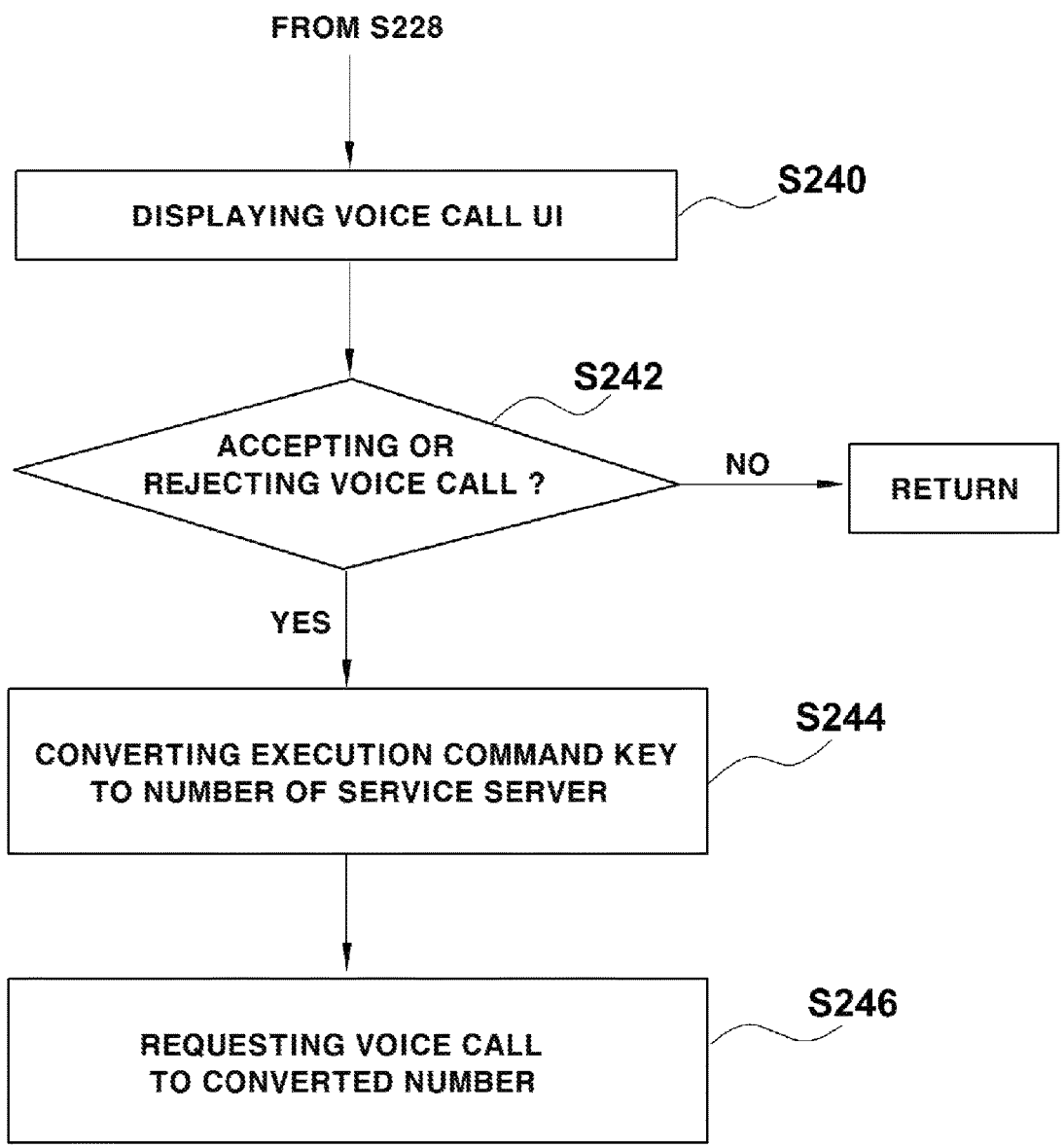
FIG. 14 shows a flow chart of a location-based service simple-requesting method in accordance with one embodiment of the present disclosure.
Figure 15:
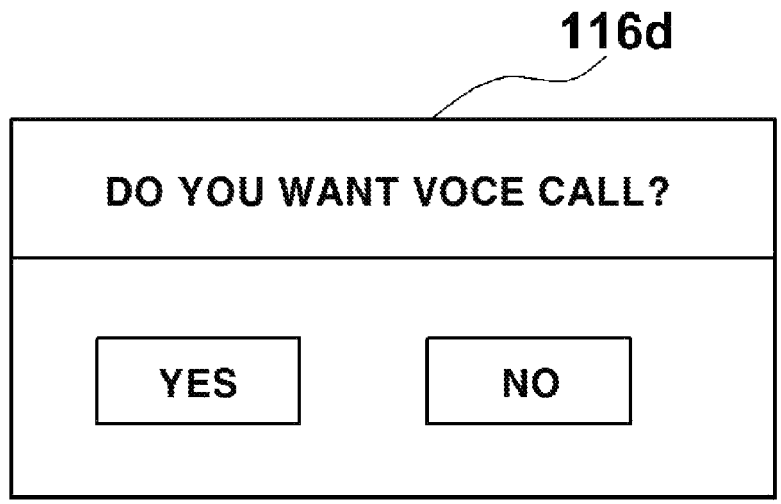
FIG. 15 shows an example of a use of a voice-call connection user interface in FIG. 14.

FIG. 14 shows a flow chart of a further location-based service simple-requesting method in accordance with one embodiment. FIG. 15 shows an example of a use of a voice-call connection user interface 116*d* in FIG. 14.

When, in the above S228 operation, the location information extraction module 114*h* fails to extract the location information, the location information is not available and thus a voice-call connection mode may be triggered.

That is, when the location information extraction module 114*h* fails to extract the location information S228, the voice-call connection request module 114*j* may be configured to display the voice-call connection user interface 116*d* on the display unit (not shown) to allow triggering of voice-call connection (S240).

FIG. 15 shows an example of the voice-call connection user interface 116*d*, where a "yes" option corresponds to a voice-call acceptance key, and a "no" option corresponds to a voice-call rejection key.

Moreover, after the voice-call connection request module 114*j* has displayed the voice-call connection user interface 116*d*, when the voice-call connection acceptance key is inputted, the execution command key may be converted into the contact numbers of the service management server 130 S242, and, then, together with the converted contact numbers, voice-call request data may be sent to the second controller 111 (S246).

The second controller 111 may be configured to convert the receive contact numbers to a call connection request signal to request a voice-call of the receive contact numbers and to send the call connection request signal to the RF unit which in turn may send the same over the carrier frequency to the service management server 130. In this way, a calling operation from the user terminal 110 to the service management server 130 may be executed.

Moreover, when the user terminal 110 calls the service management server 130 or a call center operated by the service management server 130, the server 130 or call center may be configured to response to the call via an automatic response system (ARS) or via a human exchanger.

Moreover, the server 130 or the ARS in the call center may execute a taxi call request (#1), a chauffeur request (#2), a connection to a consultant (#3), etc.

After the voice-call connection user interface 116d is displayed, when the voice-call connection rejection key is inputted, the process may return to a default set by the program.

Next, an operation of the service management server 130 after the service user terminal 110 perform the service request will be described.

Figure 16:
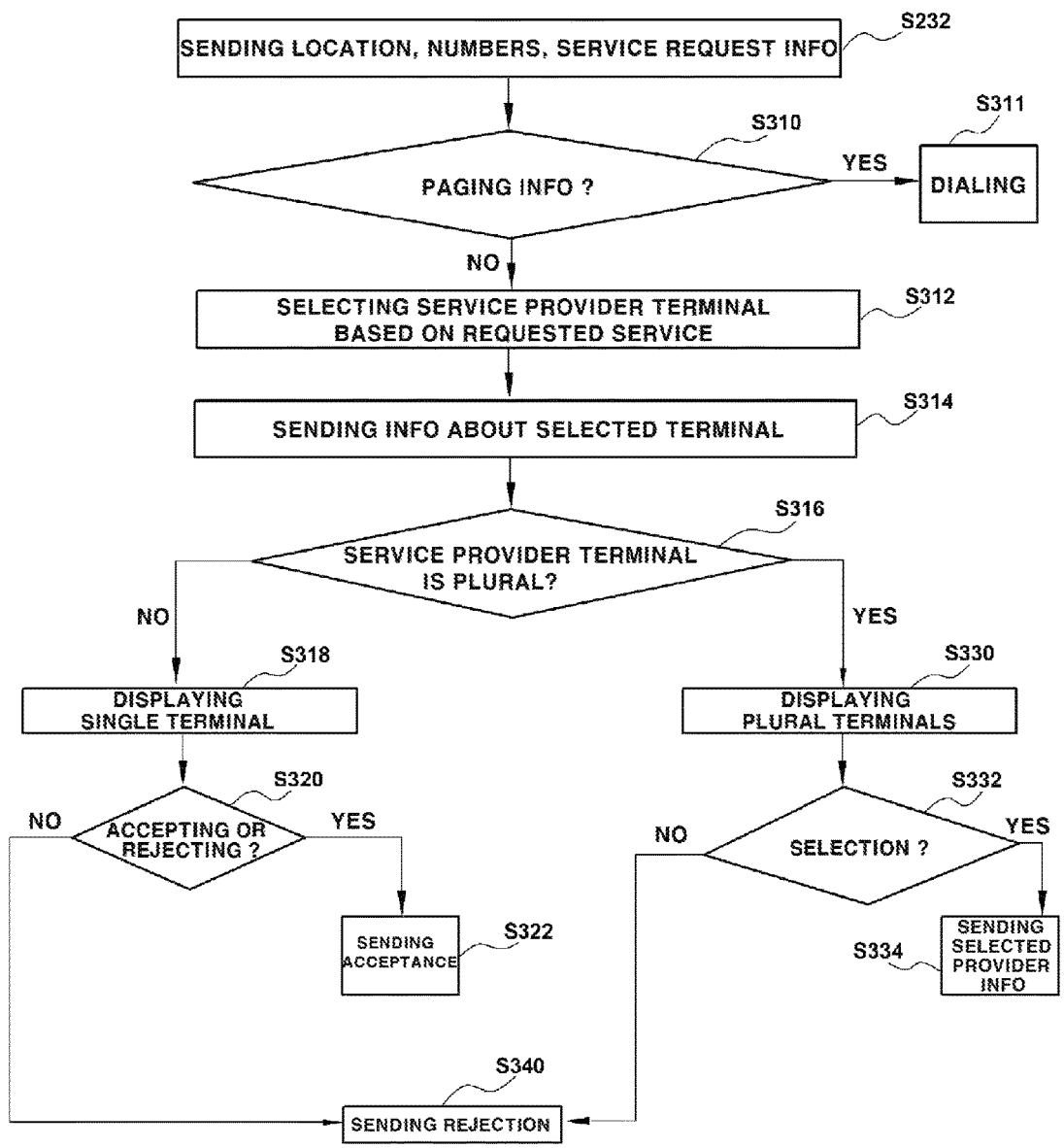
FIG. 16 shows a flow chart of a location-based service simple-requesting method in accordance with one embodiment of the present disclosure.

FIG. 16 shows a flow chart of a further location-based service simple-requesting method in accordance with one embodiment. FIG. 17 shows an example of an operation of displaying information on a single service-provider in FIG. 16. FIG. 17 shows an example of an operation of displaying information on plural service-provider in FIG. 16.

When the user terminal 110 sends the current location information and contact numbers thereof, and a service request signal, the service management server 130 receive them.

In this connection, as described above, the user terminal 110 may send the destination information and/or paging information along with them.

Upon reception of the paging information, the service management server 130 may be configured to initiate a calling operation to the contact numbers of the user terminal 110. In this connection, the service management server 130 may perform the calling operation on its own, or a call center linked to the service management server 130 may perform the calling operation.

Moreover, in this case, via an automatic dialing system, or a server operator, or a human exchanger in the call center, the calling operation to the user terminal 110 may be carried out.

Otherwise, when there is no paging information in the signal from the user terminal 110, the service management server 130 may be configured to select a service provider terminal 120 based on the service request from the user terminal 110 S312 as will be described next.

When the location-based service provided by the service management server 130 is, for example, a chauffeur service, a service requested by the user terminal 110 is a chauffeur service. In this case, the service-provider is a chauffeur and the service provider terminal 120 is a terminal of the chauffeur.

Furthermore, when the location-based service provided by the service management server 130 is, for example, a call taxi service, a service requested by the user terminal 110 is a call taxi service. In this case, the service-provider is a call taxi driver and the service provider terminal 120 is a terminal of the call taxi driver.

Moreover, when the location-based service provided by the service management server 130 is, for example, a delivery service, a service requested by the user terminal 110 is a delivery service. In this case, the service-provider is a delivery service business or provider and the service provider terminal 120 is a (wired or wireless) terminal of the delivery service business or provider.

The delivery service may include, for example, foods (chicken, pizza, Chinese foods, etc.) or flowers delivery service, etc.

Now, a method of selecting a service provider terminal 120 by the service management server 130 will be described.

The service management server 130 may store service-provider information (a name, for example, a branch business name, for example, a "OOO chicken" in a specific branch), a sex (none in a non-individual), contact numbers (for the mobile communications terminal or a wired terminal) in the service-provider database. The service management server 130 may check, in a real time, location information of the terminals 120 (service provider terminal 120) of the registered service-providers (for example, chauffeurs, call taxi drivers, delivery service businesses.

The service management server 130 may be configured to select one or plural service provider terminals 120 among the multiple service provider terminals 120 using a selection algorithm based on current location information of the multiple service provider terminals 120 and the current location information of the user terminal 110.

The selection method may include selecting a service provider terminal 120 closest to the user terminal 110 (in terms of a road distance or a straight line distance from the user terminal to the service provider terminal) or selecting a service provider terminal 120 within a predetermined distance (for example, 1 Km in terms of a road distance or 500 m in terms of a straight line distance from the user terminal to the service provider terminal) from the user terminal 110.

Moreover, the service management server 130 may send information on service-provider(s) corresponding to a selected one or plural (for example, 4) service provider terminal 120 (for example, information about a chauffeur of the selected terminal, information about a taxi driver of the selected terminal, information about a delivery service business related to the selected terminal, etc.) to the user terminal 110 (S314).

Accordingly, when a single service provider terminal 120, for example, the closest service provider terminal is selected, the service management server 130 may send information about the single service-provider. When plural service provider terminals 120, for example, service provider terminals 120 within the predetermined distance (for example, 500 m) from the user terminal are selected, the service management server 130 may send information about the plural service-providers. The former and latter may be implemented in a different manner in terms of a follow-up procedure.

The user terminal 110 receiving the service-provider information from the service management server 130 may determine whether the service-provider(s) in the service-provider information from the service management server 130 is single or plural. Specifically, the service-provider determination module 114m in the second program may be configured to determine whether the service-provider(s) in the service-provider information from the service management server 130 is single or plural (S316).

Upon the determination S316 that the service-provider(s) in the service-provider information from the service management server 130 is single, a service-provider information display module 114n may be configured to display the single service-provider information (S318).

In this connection, the service-provider information display module 114n may be configured to display the received service-provider information along with a user interface to query acceptance or rejection of the received service-provider.

FIG. 17 shows one example of the service-provider information user interface 116e where the service-provider information user interface 116e may provide keys to allow acceptance or rejection of the provided service-provider.

After the service-provider information user interface 116e is displayed, a response information transmission control module 114p may be configured to wait for inputting of the acceptance or rejection via the key input interface, and, then, to determine whether to accept or reject the received service-provider S320. When an acceptance key signal is inputted, the response information transmission control module 114*p* may be configured to send the acceptance information to the second controller 111. Then, the second controller 111 may be configured to allow sending of the acceptance information from the user terminal 110 to the service management server 130. In this way, the acceptance information may be sent to the service management server 130 (S322).

Otherwise, when via the key input interface, the rejection key signal is inputted, the response information transmission control module 114*p* may be configured to allow sending of the rejection information to the second controller 111. Then, the second controller 111 may be configured to allow sending of the rejection information from the user terminal 110 to the service management server 130. In this way, the rejection information may be sent to the service management server 130 S340.

On the other hand, upon determination by the service-provider determination module 114*m* that the service-provider(s) in the information from the service management server 130 is plural S316, the provider information display module 114*n* may be configured to display all of the plural service-providers (S330). In this connection, together with the plural service-providers, a further user interface may be displayed to allow the user to reject or select one or plural service-providers from the displayed service-providers.

For example, FIG. 18 shows a plural service-provider information user interface 116*f*. The plural service-provider information user interface 116*f* may include a selection key to allow the user to select one or plural service-providers from the displayed service-providers, and a rejection key to allow the user to reject all of the displayed service-providers.

After the plural service-provider information user interface 116*f* is displayed, the response information transmission control module 114*p* may be configured to wait for inputting of the selection or rejection via the key input interface and then to determine whether the selection or rejection key is inputted S332. When the selection key signal is inputted, the response information transmission control module 114*p* may be configured to send the selection information, for example, contact numbers of the selected service-provider to the second controller 111. Then, the second controller may be configured to allow sending of the selection information from the user terminal 110 to the service management server 130. In this way, the selection information may be sent to the service management server 130 (S334).

When via the key input interface, the rejection key signal is inputted, the response information transmission control module 114*p* may send the rejection information to the second controller 111. Then, the second controller 111 may be configured to allow sending of the rejection information from the user terminal 110 to the service management server 130. In this way, the rejection information may be sent to the service management server 130 (S340).

Examples of various embodiments has been illustrated in the accompanying drawings and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

Example embodiments was described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

What is claimed is:

1. A location-based service simple-requesting method comprising:
    an operation (S210) of receiving a key value(s) from a key input interface (113);
    an operation (S212) of determining whether the key value(s) from the key input interface (113) matches an execution command key; and
    upon determination that the key value(s) from the key input interface (113) matches the execution command key, an operation (S236) of sending service request information to a service management server (130) by a user terminal (110),
    wherein upon determination that the key value(s) from the key input interface (113) matches the execution command key, the user terminal (110) sends current location information thereof along with the service request information to the service management server (130),
    wherein upon determination that the key value(s) from the key input interface (113) matches the execution command key, the method comprises: extracting the location information in a location information reception module (112) in the user terminal (110); and
  sending the extracted current location information along with the service request information to the service management server (130),
    wherein upon determination that the key value(s) from the key input interface (113) matches the execution command key, the method comprises:
    an operation (S214) of displaying a destination setting user interface (116*a*) to query whether to input a destination for the user;
    when a destination setting acceptance key signal is inputted (S216) after the destination setting user interface (116*a*) is displayed, an operation (S218) of displaying a destination input user interface (116*b*) to allow inputting of the destination;
    an operation (S219) of inputting the destination on the destination input user interface (116*b*) via the key input interface (113);
    an operation (S220) of storing the inputted destination into a data information storage (115); and
    an operation (S228) of extracting current location information of the user terminal, wherein the user terminal (110) sends the current location information thereof, the service request information and the inputted destination information to the service management server (130).

2. A location-based service simple-requesting method comprising:
    an operation (S210) of receiving a key value(s) from a key input interface (113);
    an operation (S212) of determining whether the key value(s) from the key input interface (113) matches an execution command key; and
    upon determination that the key value(s) from the key input interface (113) matches the execution command key, an operation (S236) of sending service request information to a service management server (130) by a user terminal (110),
    wherein upon determination that the key value(s) from the key input interface (113) matches the execution command key, the user terminal (110) sends current location information thereof along with the service request information to the service management server (130),
wherein upon determination that the key value(s) from the key input interface (113) matches the execution command key, the method comprises: extracting the location information in a location information reception module (112) in the user terminal (110); and
sending the extracted current location information along with the service request information to the service management server (130),
wherein upon determination that the key value(s) from the key input interface (113) matches the execution command key, the method further comprises:
an operation (S222) of checking a state of a location information reception module (112) for acquiring the location information of the user terminal (110) and determining based on the checking result whether the location information reception module is in a turn-on state;
upon determination that the location information reception module (112) is not in a turn-on state (S222), an operation (S224) of outputting a control command using the location information reception module control module (114g) to enable the location information reception module (112) to be in a turn-on state;
an operation (S226) of turning-on the location information reception module (112) in a response to the control command; and
when the operation (S226) is executed or it is determined that the location information reception module (112) is in a turn-on state (S222), an operation (S228) of extracting current location information of the user terminal (110) from the location information reception module (112).

3. A location-based service simple-requesting method comprising:
an operation (S210) of receiving a key value(s) from a key input interface (113);
an operation (S212) of determining whether the key value(s) from the key input interface (113) matches an execution command key; and
upon determination that the key value(s) from the key input interface (113) matches the execution command key, an operation (S236) of sending service request information to a service management server (130) by a user terminal (110),
wherein upon determination that the key value(s) from the key input interface (113) matches the execution command key, the user terminal (110) sends current location information thereof along with the service request information to the service management server (130),
wherein upon determination that the key value(s) from the key input interface (113) matches the execution command key, the method comprises: extracting the location information in a location information reception module (112) in the user terminal (110); and
sending the extracted current location information along with the service request information to the service management server (130),
wherein, prior to the operation (S236) of the sending the current location information and contact numbers of the user terminal (110) and the service request information to the service management server (130), the method further comprises:

an operation (S232) of displaying a paging setting user interface (116c) to allow setting of paging of the service management server (130);
when a paging setting rejection key is inputted (S234), an operation (S236) of sending the current location information and contact numbers of the user terminal (110) and the service request information to the service management server (130); and
when a paging setting acceptance key is inputted (S234), an operation (S238) of sending the current location information and contact numbers of the user terminal (110) and the service request information together with paging information to the service management server (130).

4. The method of claim 3, further comprising:
an operation (S310) of checking by the service management server (130) whether the paging information is present in a signal from the user terminal (110); and
upon determination that the paging information is present in a signal from the user terminal (110), an operation of automatically calling the user terminal (110) by the service management server (130).

5. The method of claim 3, further comprising:
an operation (S310) of checking by the service management server (130) whether the paging information is present in a signal from the user terminal (110);
upon determination that the paging information is not present in a signal from the user terminal (110), an operation (S312) of selecting a service provider terminal (120) based on the service request from the user terminal (110); and
an operation (S314) of sending service-provider information on the selected service provider terminal (120) to the user terminal (110).

6. The method of claim 5, further comprising:
an operation (S316) of determining by the user terminal (110) whether a service provider in the service-provider information from the service management server (130) is single or plural;
upon determination that the service provider in the service-provider information from the service management server (130) is single (S316), an operation (S318) of displaying the single service-provider;
an operation (S320) of determining whether to accept or reject the displayed service-provider;
upon determination to accept the displayed service-provider, an operation (S322) of sending acceptance information to the service management server (130); and
upon determination to reject the displayed service-provider, an operation (S340) of sending rejection information to the service management server (130).

7. The method of claim 5, further comprising:
an operation (S316) of determining by the user terminal (110) whether a service provider in the service-provider information from the service management server (130) is single or plural;
upon determination that the service provider in the service-provider information from the service management server (130) is plural (S316), an operation (S3330) of displaying the plural service-providers;
an operation (S332) of determining whether to select one of the plural service-providers or reject all of the plural service-providers; and
an operation (S340) of sending selection information on a selected service-provider upon determination (S332) to select one of the plural service-providers, or sending rejection information to the service management server (130).

* * * * *